United States Patent
Matsumoto

Patent Number: 4,975,342
Date of Patent: Dec. 4, 1990

[54] FUEL CELL

[75] Inventor: Masaaki Matsumoto, Kobe, Japan

[73] Assignee: Mitsubishi Denki Kabushiki Kaisha, Japan

[21] Appl. No.: 299,110

[22] Filed: Jan. 19, 1989

Related U.S. Application Data

[63] Continuation-in-part of Ser. No. 75,967, Jul. 21, 1987, abandoned.

[30] Foreign Application Priority Data

Jul. 24, 1986 [JP] Japan ................. 61-176144
Jul. 24, 1986 [JP] Japan ................. 61-176145

[51] Int. Cl.$^5$ ............................. H07M 4/88
[52] U.S. Cl. ................. 429/41; 429/115; 29/623.1
[58] Field of Search ........... 429/41, 42; 427/115; 29/623.3

[56] References Cited

U.S. PATENT DOCUMENTS

| | | | |
|---|---|---|---|
| 3,268,365 | 8/1966 | McQuade et al. | 429/41 |
| 3,867,206 | 2/1975 | Trocciola et al. | 136/86 D |
| 4,000,006 | 12/1976 | Trocciola et al. | 429/41 |
| 4,185,145 | 1/1980 | Breault | 429/41 |
| 4,279,970 | 7/1981 | Breault et al. | 429/41 |
| 4,411,968 | 10/1983 | Reiser et al. | 429/41 |
| 4,647,516 | 3/1987 | Matsumura et al. | 429/19 |
| 4,686,159 | 8/1987 | Miyoshi | 429/39 |
| 4,695,518 | 9/1987 | Trocciola et al. | 429/41 |
| 4,767,680 | 8/1988 | Hijikata et al. | 429/39 |

FOREIGN PATENT DOCUMENTS 57-168473 10/1982 Japan .

Primary Examiner—Stephen J. Kalafut
Attorney, Agent, or Firm—Leydig, Voit & Mayer

[57] ABSTRACT

An electrolyte matrix is integrated with at least one electrode catalyst layer, namely, catalyst layers which can be independent from an electrode substrate. Therefore, the permeation of catalyst to the substrate can be prevented, the amount of catalyst used can be reduced, and an electrode of uniform thickness and composition can be produced and used.

19 Claims, 2 Drawing Sheets

FUEL CELL

This application is a Continuation-In-Part of U.S. patent application Ser. No. 07/075,967, filed July 21, 1987, entitled "Fuel Cell" now abandoned.

BACKGROUND OF THE INVENTION

This invention relates to a fuel cell and more particularly, to a cell structure of a fuel cell stack.

FIG. 1 is a partial cross-sectional view illustrating a typical cell structure of a fuel cell which is disclosed, for example, in Japanese Patent Publication No. 58-152 and others. In this figure, electrodes 2 and 3 are disposed on both faces of an electrolyte matrix 1, and are comprised of electrode substrates 4 and 5 and electrode catalyst layers 6 and 7, respectively. These catalyst layers 6 and 7 are formed by coating a catalyst in a paste or liquid state on the substrates 4 and 5 and are thus supported thereon. The electrode substrates 4 and 5 are made of a porous material such as carbon fiber. One example of a method of producing the electrodes is disclosed in Japanese Patent Laid-Open No. 57-168473.

At both faces of both ends of the matrix 1 (only one end being shown) wet gas seals 8 and 9 are disposed to be adjacent to the end surfaces of the substrates 4 and 5, respectively. These wet gas seals 8 and 9 prevent the fuel and oxidant gases in the gas channels 11 and 12 from leaking through the porous substrates 4 and 5 to the outside of the fuel cell. Gas separators 10 (also called interconnectors) made of materials such as impermeable dense carbon plate are disposed at the back faces of the substrates 4 and 5 and wet gas seals 8 and 9. On the portions of the gas separators 10 adjacent to the substrates 4 and 5, gas channels 11 and 12 are provided for the fuel and oxidant gases, these channels crossing each other orthogonally.

In operating the fuel cell, fuel and oxidant gases are supplied to the gas channels 11 and 12 and then reach the whole area of the substrates 4 and 5, where the gases are diffused to reach the catalyst layers 6 and 7. Then, the fuel and oxidant gases at the catalyst layers 6 and 7 react with each other and generate power through the electrolyte matrix 1. At this time, non-reacted excess gases and water vapor, which is a reaction product, are exhausted to the exterior of the fuel cell through the gas channels 11 and 12. Moreover, the exhausted gas will contain an electrolyte vaporized from the matrix 1 and electrodes 6 and 7 which is determined by the operating conditions of the fuel cell.

However, in a conventional fuel cell as described-above, when the catalyst is coated on the substrates 4 and 5, the catalyst permeates into the substrates, because the catalyst is coated in a paste or liquid state and the substrates are porous. Since the permeated volume within each substrate 4 and 5 or between the substrates 4 and 5 are different, the coated catalyst volume or the thickness of the electrodes will not be uniform, making it difficult to obtain stable characteristics for each cell. The amount of the catalyst coated on the substrates 4 and 5 must be more than that actually consumed because the permeation of the catalyst requires excess catalyst for coating. Moreover, due to catalyst permeation, when an internal reservoir is provided on ribbed electrodes, it is difficult to estimate the volume of the internal reservoir and still obtain the expected cell performance. Further, from a productivity standpoint, a plurality of processes, such as providing the catalyst layers 6 and 7 on the substrates 4 and 5 and laminating the substrates 4 and 5 to the electrolyte matrix 1, raises the proportion of defective fuel cells and adversely affects productivity.

SUMMARY OF THE INVENTION

Accordingly, an object of the present invention is to provide a fuel cell in which the permeation of catalyst into the substrate can be diminished, the amount of catalyst used can be reduced, and electrodes having a uniform thickness and composition can be produced with high productivity.

In order to achieve the above object, according to one aspect of the present invention, there is provided a fuel cell having a plurality of fuel cell units piled one over another, each of the fuel cell units comprising: a laminated layer including an electrolyte matrix layer and a pair of electrode catalyst layers sandwiching both faces of the electrolyte matrix layer, the electrode catalyst layers being integrally formed with the electrolyte matrix layer; a pair of electrode substrates disposed on the outer faces of the electrode catalyst layers; and a pair of gas separators disposed on the outer faces of the electrode substrates.

According to another aspect of the present invention, there is provided a fuel cell having a plurality of fuel cell units piled one over another, each of the fuel cell units comprising: an integrated layer including an electrolyte matrix layer and a first electrode catalyst layer disposed on one face of the electrolyte matrix layer, the first electrode catalyst layer being integrally formed with the electrolyte matrix layer; a second electrode catalyst layer disposed on the other face of the electrolyte matrix layer; a pair of electrode substrates disposed on the outer faces of the first and second electrode catalyst layers; and a pair of gas separators disposed on the outer faces of the electrode substrates.

BRIEF DESCRIPTION OF THE DRAWINGS

The present invention will be become more readily apparent from the following detailed description of a preferred embodiment of the present invention taken in conjunction with the accompanying drawings, in which.

PREFERRED EMBODIMENT OF THE INVENTION

Figure 1:
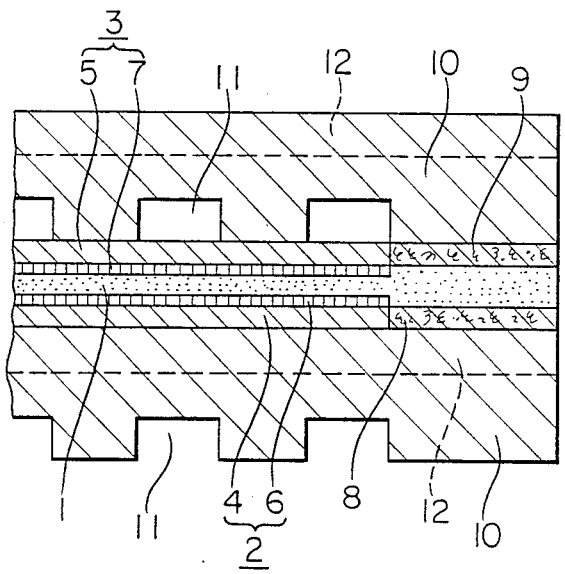
FIG. 1 is a partially sectional view showing a cell structure of a conventional fuel cell.
Figure 2:
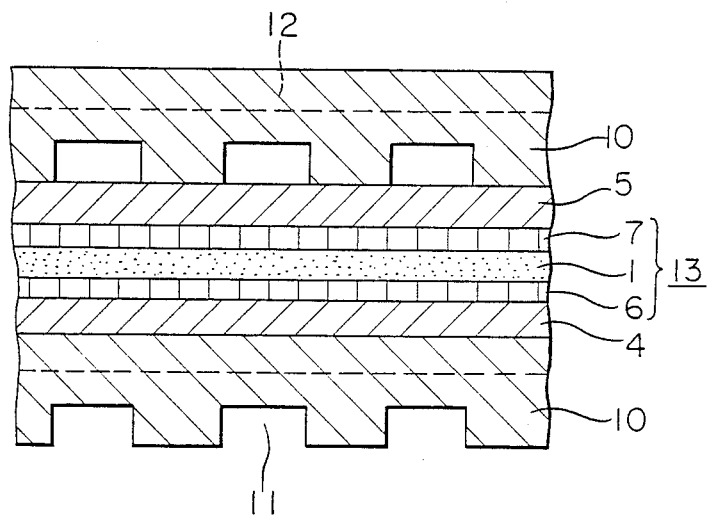
FIG. 2 is a partially sectional view showing a cell structure of a fuel cell in accordance with one embodiment of the present invention.

FIG. 2 is a partially sectional view showing a cell structure of a fuel cell in accordance with the present invention. In FIG. 2 and other following figures, the same reference numerals indicate the same or corresponding parts.

As in the prior art, a fuel cell (not shown) is fabricated by piling a plurality of fuel cell units on top of one another. As shown in FIG. 2, according to the present invention, each fuel cell unit comprises a laminated layer 13 including an electrolyte matrix layer 1 and a pair of electrode catalyst layers 6 and 7 which are disposed on both faces of the electrolyte matrix layer 1 and integrally formed with the electrolyte matrix layer 1; a pair of electrode substrates 4 and 5 disposed on the both outer faces of the electrode catalyst layers 6 and 7; and a pair of gas separators 10 disposed on the outer faces of the electrode substrates 4 and 5.

The electrode catalyst layers 6 and 7 sandwich both faces of the electrolyte matrix layer 1 and are integral therewith to form the sheet-like laminated layer 13. It is also permissible to have only one face of the matrix layer 1 laminated with a catalyst layer, in which case an electrode catalyst layer 7 is provided in another step on the other surface of the matrix layer 1. The laminated layer 13 can be formed by a method of bonding such as by pressure application using a roll or heat pressing, for example. The catalyst layers 6 and 7 of the laminated layer 13 are solid sheets. The electrode substrates 4 and 5 are disposed adjacent to the backs of the catalyst layers 6 and 7, while the gas separators 10 are disposed adjacent to the outside of the substrates 4 and 5. Gas channels 11 and 12 are formed in the gas separators 10 for supplying and exhausting fuel gas or oxidant gas, the gas channels 11 and 12 crossing each other orthogonally.

In the thusly formed fuel cell, the fuel gas and oxidant gas are supplied to the gas channels 11 and 12 from the exterior of the fuel cell. The supplied gases then flow through the gas channels 11 and 12 and diffuse through the porous substrates 4 and 5 to subsequently reach the whole area of the catalyst layers 6 and 7 in the laminated layer 13. Here, the gases react with each other by the aid of a catalyst contained in the catalyst layers 6 and 7 and generate electrical power through the matrix 1.

As described-above, the laminated layer 13 is formed by integrating the matrix 1 with the catalyst layers 6 and 7, the solid catalyst layers 6 and 7 being independent from the substrates 4 and 5. Therefore, even if the catalyst layers 6 and 7 are piled on to the substrates 4 and 5, catalyst permeation will not occur, whereby uniform catalyst layers can be obtained and the amount of catalyst required can be reduced. Even in case of substrates having an internal reservoir, the volume of the electrolyte impregnated into the electrolyte matrix layer 1 can easily be estimated and stable cell characteristics can be established. Further, as the electrolyte matrix layer 1 and the electrode catalyst layers 6 and 7 are integrally formed into the laminated layer 13 of a sheet-form, the processes for fabricating the fuel cell can be reduced, the proportion of defective fuel cells can be lowered, and productivity can be improved.

For the electrolyte matrix layer, silicon carbide, other carbides (for example, $B_4C$, WC, etc.) and mixtures thereof, and polytetrafluoroethylene as a binder, may be used.

For the electrode catalyst layers, a catalyst formed by carbon and a catalyst having platinum, which are bonded to each other by polytetrafluoroethylene as a binder, may be used.

Figure 3:
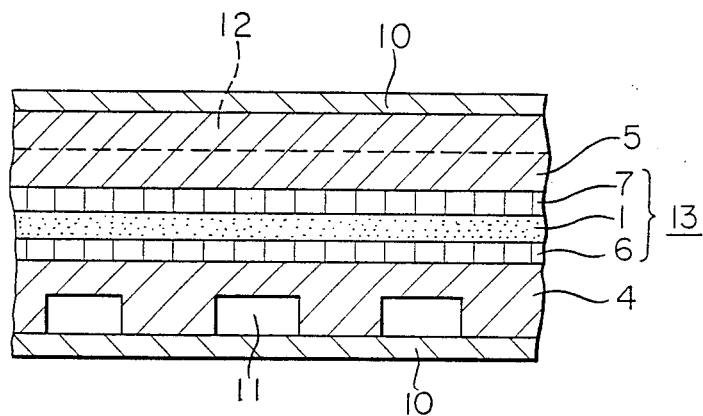
FIG. 3 is a partially sectional view showing a cell structure of a fuel cell having a ribbed electrode in accordance with another embodiment of the present invention.
Figure 4:
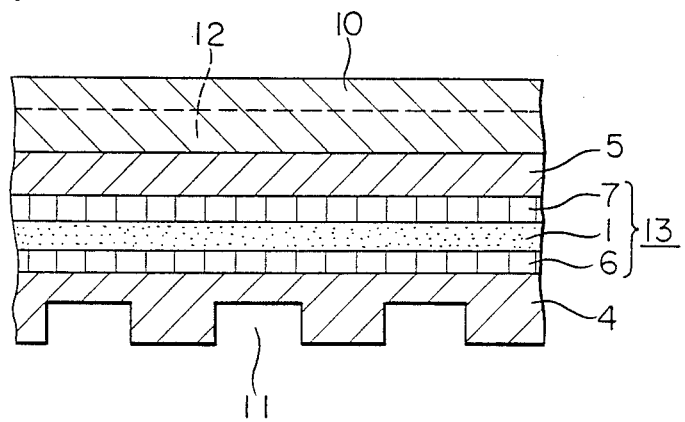
FIG. 4 is a partially sectional view showing a cell structure of a hybrid type fuel cell in accordance with still another embodiment of the present invention.

In the above-mentioned embodiments, the cell structure of the ribbed gas separator was explained in which a pair of substrates are flat plates. However, the present invention can also be applied to a ribbed electrode type fuel cell as illustrated in FIG. 3 or a fuel cell having a hybrid type cell structure as illustrated in FIG. 4, whereby the same effect as in the above-described embodiment can be obtained. In the ribbed electrode type fuel cell as shown in FIG. 3, the gas channels 11 and 12 are formed in the substrates 4 and 5 and the gas separators 10 disposed on the outsides of the substrates are relatively thin. In the hybrid type fuel cell as shown in FIG. 4, the gas channels 11 and 12 are disposed in the substrate 4 and the gas separator 10, respectively.

While a few embodiments of the present invention have been described herein, it will be apparent to those skilled in the art that various modifications thereof can be made without departing from the scope of the invention as defined in the following claims.

What is claimed is:

1. A fuel cell having a plurality of fuel cell units piled one over another, each of said fuel cell units comprising:
   a solid, unitary, preformed integrated laminate including an electrolyte matrix layer and a pair of electrode catalyst layers sandwiching both faces of said electrolyte matrix layer, said electrode catalyst layers being integrally formed with said electrolyte matrix layer;
   a pair of electrode substrates disposed on the outer faces of said integrally formed electrode catalyst layers; and a pair of gas separators disposed on the outer faces of said electrode substrates.

2. A fuel cell as claimed in claim 1 wherein said electrode catalyst layers are laminated with said electrolyte matrix layer through bonding.

3. A fuel cell as claimed in claim 2 wherein said electrode catalyst layers are bonded to said electrolyte matrix layer by pressure application.

4. A fuel cell as claimed in claim 1 wherein said electrode catalyst layers are laminated with said electrolyte matrix layer by heat pressing.

5. A fuel cell as claimed in claim 1 wherein gas channels are formed in said electrode substrates for supplying and exhausting fuel gas or oxidant gas, respectively.

6. A fuel cell as claimed in claim 1 wherein gas channels are formed in said gas separators for supplying and exhausting fuel gas and oxidant gas, respectively.

7. A fuel cell as claimed in claim 1 wherein one of said electrode substrates has gas channels and is disposed adjacent to one face of said laminated layer without a gas separator, and wherein one of said gas separators has gas channels and is disposed adjacent to the other of said electrode substrates which is adjacent to the other face of said laminated layer.

8. A fuel cell having a plurality of fuel cell units piled one over another, each of said fuel cell units comprising:
   an unitary preformed integrated layer including an electrolyte matrix layer and a pair of electrode catalyst layers sandwiching both faces of said electrolyte matrix layer, said electrode catalyst layers being integrally formed with said electrolyte matrix layer;
   a pair of electrode substrates disposed on the outer face of said preformed integrated layer; and
   a pair of gas separators disposed on the outer faces of said electrode substrates, said gas separators containing gas channels for supplying and exhausting fuel gas and oxidant gas.

9. A fuel cell having a plurality of fuel cell units piled one over another, each of said fuel cell units comprising:
   a solid, unitary, preformed, integrated laminate including an electrolyte matrix layer and a pair of electrode catalyst sheets sandwiching both faces of said electrolyte matrix layer, said electrode catalyst sheets being integrally formed with said electrolyte matrix layer;

a pair of electrode substrates disposed on the outer faces of said integrally formed electrode catalyst sheets; and a pair of gas separators disposed on the outer faces of said electrode substrates.

10. A process for producing a fuel cell unit comprising the steps of:

laminating an electrolyte matrix layer between a pair of electrode catalyst layers, locating electrode substrate layers on the outer faces of the electrode catalyst layers, and locating gas separators on the outer faces of the electrodes substrate layers.

11. A method for producing a fuel cell unit according to claim 10, wherein said electrode catalyst layers are laminated with said electrolyte matrix layer through bonding.

12. A method for producing fuel cell units according to claim 11 wherein said electrode catalyst layers are bonded to said electrolyte matrix layer by pressure application.

13. A method for producing fuel cell units according to claim 10, wherein said electrode catalyst layers are laminated with said electrolyte matrix layer by heat pressing.

14. A method of producing fuel cell units according to claim 10 further including the step of forming gas channels in said electrode substrate.

15. A method of producing fuel cell units according to claim 10 further including the step of forming gas channels in said gas separator.

16. A method for producing a fuel cell according to claim 10 including the step of stacking each individual fuel cell unit.

17. A process for producing a fuel cell unit comprising the steps of:

laminating an electrolyte matrix layer between a pair of sheets of electrode catalyst, locating electrode substrate layers on the outer faces of the electrode catalyst sheets, and locating gas separators on the outer faces of the electrodes substrate layers.

18. A method for producing a fuel cell unit according to claim 17, wherein said electrode catalyst sheets are laminated with said electrolyte matrix layer through bonding.

19. A method for producing fuel cell units according to claim 17 wherein said electrode catalyst sheets are bonded to said electrolyte matrix layer by pressure application.

* * * * *